Patented Sept. 26, 1939

2,174,293

UNITED STATES PATENT OFFICE 2,174,293

PURIFICATION OF ETHERS

Norman D. Scott, Sanborn, N. Y., assignor to E. I. du Pont de Nemours & Company, Wilmington, Del., a corporation of Delaware No Drawing. Application May 20, 1938, Serial No. 209,093

11 Claims. (Cl. 260—616)

This invention relates to an improved method of purifying ethers and the improved ethers obtained thereby and, in particular, to the use of nuclear addition compounds of polycyclic aromatic compounds and alkali metals as purifying agents.

Heretofore in the purification of diethyl ether, traces of water, alcohol and other impurities have been removed by a treatment with calcium chloride followed by a treatment with phosphorus pentoxide or metallic sodium. In the production of diethyl ether of special purity metallic sodium has long been used. These known methods, however, have the disadvantage that handling of metallic sodium involves certain difficulties and hazards and that the tendency of the sodium to become coated with sodium compounds makes the purification process slow and erratic.

An object of the present invention is to provide an improved process for the purification of ethers. Another object of the invention is to provide means for further purifying ethers which have been purified in the conventional way. A further object is to provide an improved diethyl ether, which is especially useful for anaesthesia and organic syntheses. Other objects will be hereinafter apparent.

It has been found that the nuclear addition compounds of polycyclic aromatic compounds and alkali metals such as those formed by adding alkali metals to polycyclic aromatic compounds such as naphthalene, diphenyl, phenanthrene, and the like, have decided advantages in the purification of ethers, more particularly of diethyl ether, in that they offer less difficulty and danger in handling and are more effective than the free alkali metals so that substantially pure ethers can be obtained.

The organic metallic addition compounds which can be utilized for the present invention are characterized by their being polycyclic aromatic compounds in which the alkali metal is added to a CH group of the nucleus. Various compounds of this type and methods for preparing such compounds have been described in United States Patents 2,019,832, 2,023,793, 2,027,000, and 2,108,277 and in my co-pending applications Serial Nos. 49,556, filed November 13, 1935 which issued August 2, 1938 as United States Patent 2,125,401 and 64,173 filed February 15, 1936 which issued May 31, 1938 as United States Patent 2,119,493. In the above mentioned patents it is disclosed that alkali metals and specifically sodium forms addition compounds with naphthalene and other polycyclic aromatic hydrocarbons, such as anthracene, phenanthrene, acenaphthene, diphenyl, retene and the like, when the reaction is promoted by the utilization of certain solvents and classes of solvents, such as certain ethers, e. g. non-cyclic monoethers containing a $CH_3$—O group in which the ratio of oxygen atoms to carbon atoms is not less than 1:4, such as dimethyl ether, methyl ethyl ether, methyl normal propyl ether, methyl isopropyl ether, diethers such as methylal, glycol dimethyl ether, cyclic ethers such as glycol formal and dioxane, other polyethers such as glycerol trimethyl ether, glycerol monoformal methyl ether, dimethylene pentaerythrite, certain dialkylamino aliphatic mono ethers, such as dimethylamino dimethyl ether, dimethylaminoethyl methyl ether, certain tertiary amines, such as trimethyl amine, dimethyl ethyl amine and the like. Hereinafter such solvents promoting said reactions will be designated as effective solvents.

It is, however, possible to use besides these effective solvents, other solvents as diluents, such as hydrocarbons, alkyl sulfides or non-effective ethers. There is, however, a minimum concentration of the effective ether in the non-effective solvent, beyond which the reaction will not proceed. The reaction also can be carried out in mixtures of the different solvents.

One convenient method for carrying out this reaction is to dissolve sodium in a solution of naphthalene or other polycyclic aromatic hydrocarbon in liquid dimethyl ether at a temperature below —24° C. while stirring or abrading the sodium in contact with the mixture to start the reaction. When the reaction is started, the solution becomes highly colored and solution of the metal occurs at a rapid rate. The amount of sodium readily dissolved will range in general from 1 to 2 gram atoms per gram molecule of the aromatic compound. However, it has been found that a solution of naphthalene in an effective solvent will only readily dissolve sodium in an amount equivalent to one gram atom of sodium for each gram molecule of naphthalene; thereafter the reaction becomes extremely slow. This is somewhat unexpected, since reaction products obtained by further treatment of the sodium-naphthalene addition compound indicate that it is disodium naphthalene ($C_{10}H_8Na_2$).

In view of the fact that the solution which is thus prepared is a highly colored green solution and readily conducts an electric current, it is possible that the compound exists in solution as a free radical which may be represented by the formula:

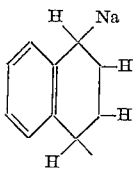

The soluble addition compound may involve the combination of disodium naphthalene with an extra molecule of naphthalene in some other manner. Thus its formula could be written:

$$Na_2C_{10}H_8—C_{10}H_8$$

without specifying the exact manner of combination. Moreover this soluble addition compound may also include other compounds, all of which are characterized by containing the group —CHNa, in which the carbon atom is nuclear. However, it is to be understood that the invention is not restricted to addition compounds prepared in the above described manner.

I have found that my process can be carried out with any of the above mentioned solutions, provided that the solvents are not decomposed to volatile decomposition products by the addition compounds themselves and thus contaminate the purified ethers with unsaturated materials such as vinyl ethers and so forth. However, where only the water is to be removed from the ether or where such organic decomposition compounds are not considered to be harmful such solvents can be used. In the purification of diethyl ether for anaesthesia such solvents, of course, are excluded. The minimum amount of such solvents is determined by the stability of the addition compound only and the nature of these solvents has no influence whatever on the purification process of the invention. Thus, under certain conditions with specially stable addition compounds as, for example, disodium dihydro anthracene, almost all of the solvent can be evaporated without substantially affecting its stability, while when utilizing disodium naphthalene at least enough of the solvent should be present so as to have the addition compound in the liquid phase.

A suitable procedure for carrying out the invention consists in adding the ether to a solution of sodium naphthalene in dimethyl ether followed by a fractional distillation for the separation of the purified ether from dimethyl ether and naphthalene.

Ethers of suitable purity can also be obtained by using a solution of the sodium compound in dimethylene pentaerythrite. The use of dimethylene pentaerythrite as a solvent, however, has the disadvantage that a considerable amount of this dicyclic ether seems to be destroyed by reaction with the sodium naphthalene. However, the decomposition products which are formed are not volatile and therefore do not contaminate the purified ether.

It is also possible to prepare the nuclear alkali metal addition compound in the ether to be purified itself and utilizing this solution for the purification of said ether, in case the ether to be purified is an effective solvent for the formation of said alkali metal addition compound itself. Thus it has been found that glycol ethers, such as dimethyl glycol ether, which is an effective solvent, can be purified by forming the alkali metal addition compound in the glycol ether itself and utilizing this solution in the purification of further amounts of the ether, or by forming it directly in the total amount of ether to be purified. From these solutions the purified ether can be directly obtained by distillation without any additional separation steps. The thus obtained purified glycol ethers are valuable for organic syntheses and have a very high degree of purity. Of course, various other effective ethers, such as methyl ethyl ether and the like can be purified in a similar way. However, since the formation of the nuclear alkali metal addition compounds is very slow in effective solvents which are contaminated e. g. by relatively large amounts of water, it is often preferable to form the nuclear alkali metal addition compound in a previously purified effective ether and utilize this solution for the purification of further amounts of ether. It is furthermore advantageous to partially purify the total amount of the ether to be purified e. g., with concentrated caustic solutions having advantageously an alkalinity equivalent to a sodium hydroxide solution of at least 20% by weight, preferably of 40% to 50% by weight, and only then to contact this partially purified ether with the nuclear alkali metal addition compounds for obtaining purified ethers of highest grade. Thus dimethyl glycol ether which has been contaminated with water and other inorganic and organic materials can be first scrubbed with a concentrated sodium hydroxide solution of about 20% to 50%, preferably of 40% to 50% by weight, and then added to the sodium and the naphthalene so as to form the sodium naphthalene addition compound. The solution obtained in this way is then fed to another vessel and the pure dimethyl glycol ether is distilled from the solution.

Although these glycol ethers and also glycerol ethers tend to react with the alkali metal addition compounds to produce unsaturated ethers, this has not been found to be deleterious in the use of these ethers for organic syntheses or for their use as solvents or the like. Moreover at lower temperatures these side reactions are very slow and especially so when the concentration of the alkali metal addition compound is low. In the purification of diethyl ether for anaesthesia, however, such ethers should not be used as solvents for the nuclear alkali metal addition compounds and the use of dimethyl ether as solvent is preferred to any other solvent, since it makes possible the production of diethyl ether which is almost absolutely dry and free from other contaminations.

The amount of alkali metal hydrocarbon compound required will vary over a wide range, depending upon the nature and amount of impurities in the ether to be purified and the degree of purification desired. The amount of the organo metallic addition compound necessary for purifying a given ether, however, can be easily determined by adding the ether to be purified by burette to a known weight of said organo metallic addition compound until the solution loses its color, which is a sign that all of the alkali metal has been used in the reaction. For example, one liter of U. S. P. ether as purchased required 7.8 grams of sodium as sodium naphthalene. When the same ether had been washed with water to remove the ethanol and dried over calcium chloride only 2.3 grams of sodium were required per liter. Accordingly, it has been found preferable in cases of this sort to subject the ether before treatment with the organo metallic addition compound to a treatment with water and calcium chloride in order to decrease the necessary amount of the organo metallic addition compound for the ultimate purification as far as possible.

The invention is illustrated by the following examples although variations of the method will be obvious.

Example I 200 cc. of dimethyl ether was condensed in a flask containing a nitrogen atmosphere and 23 grams of naphthalene were added thereto. To this solution was then added 6 grams of sodium in the form of 1 mm. wire and the mixture was agitated for 1½ hours to dissolve the sodium. The temperature was maintained at −60° C. 1500 cc. ethyl ether which had been previously washed with water and dried with calcium chloride was then added gradually and the mixture allowed to stand for three hours. Thereafter the dimethyl ether and diethyl ether were distilled through a fractionating column, which was 8 feet high and packed with beads. The dephlegmator and the upper third of the column were cooled to about −20° C. with a circulating "dry ice" methanol bath. The ether distilled at exactly 34° C. 8% of the diethyl ether came over in the dimethyl ether fraction and 9% of the diethyl ether was left in the still residue and in the column packing. In the still residue 1.5 grams of unreacted sodium were recovered.

The diethyl ether obtained by the above purification gave no test for acid, peroxide, aldehydes or unsaturated products. When 10 cc. were allowed to evaporate on a piece of filter paper, no foreign odor remained. On evaporation of 50 cc. a residue of 0.0002 gram was left, whereas the purest diethyl ethers obtainable left a residue of about 0.0006 gram from 50 cc.

The results obtained in this example, however, are not optimal. Thus the charge of dimethyl ether can be cut to 10% of the volume of the diethyl ether to be purified. Also the sodium could be cut down and generally satisfactory results will be obtained if the final solution is 0.02 N with respect to soluble sodium compound. Better results can be also obtained by adjusting the naphthalene charge to 1 mole per gram atom of sodium charged.

Example II 0.24 pound of metallic sodium and 0.5 pound of naphthalene were placed in a reaction vessel and 10.5 pounds of impure dimethyl glycol ether were added. The mixture was then continuously agitated by means of a device which also slowly abraded the sodium until the liquid was of intense green color, indicating the formation of the sodium naphthalene addition compound. This solution was then drawn off the unreacted sodium and the purified dimethyl glycol ether was distilled off. About 10% of the sodium was consumed by the purification process and 94.5% of the ether was recovered as pure anhydrous dimethyl glycol ether.

The purification as described in this example can be advantageously speeded up by adding to the sodium and naphthalene before adding the impure ether a small amount of pure dimethyl glycol ether so as to form a small amount of the green sodium naphthalene addition compound, since the reaction starts more readily with the pure ether. However, when started the reaction proceeds readily with the unpurified ether and can be continuously carried out without further additions of pure ether.

The invention, therefore, allows a purification of ethers to a degree which heretofore could not be obtained. This is especially important for the production of diethyl ether for anaesthesia where the highest purity is important. Although applicant does not know the exact mechanism of the reaction it is believed that this might be due to the alkali metal compounds being in solution but having most of the energy of the alkali metal in reacting with the impurities.

I claim:

1. In a process for purifying ethers the step of contacting said ethers with a nuclear addition compound of a polycyclic aromatic compound and an alkali metal.

2. In a process for purifying diethyl ether the step of contacting said diethyl ether with a nuclear addition compound of a polycyclic aromatic compound and an alkali metal.

3. In a process for purifying diethyl ether the step of contacting said diethyl ether with a solution of a nuclear addition compound of a polycyclic aromatic compound and an alkali metal.

4. In a process for purifying diethyl ether the step of contacting said diethyl ether with a nuclear addition compound of a polycyclic aromatic compound and an alkali metal dissolved in dimethyl ether.

5. In a process for purifying diethyl ether the step of contacting said diethyl ether with a nuclear addition compound of naphthalene and sodium dissolved in dimethyl ether.

6. In a process for purifying diethyl ether the step of contacting a diethyl ether which has been washed with water and dried with calcium chloride with a nuclear addition compound of naphthalene and sodium dissolved in dimethyl ether.

7. In a process for purifying ethers the step of forming a nuclear addition compound of a polycyclic aromatic compound of an alkali metal in the ethers to be purified.

8. In a process for purifying glycol ethers the step of forming a nuclear addition compound of a polycyclic aromatic compound and an alkali metal in a previously purified part of said glycol ether and contacting said solution of the nuclear addition compound with the unpurified glycol ether.

9. A process for purifying glycol ethers, which comprises first purifying said ethers with caustic alkaline solution equivalent to a sodium hydroxide solution containing at least 20% by weight anhydrous sodium hydroxide and then contacting said partially purified ethers with an alkali metal and a polycyclic aromatic compound and thereby forming a nuclear alkali metal addition compound of said polycyclic aromatic compound and distilling off the thus purified ether.

10. A process for purifying dimethyl glycol ether which comprises contacting dimethyl glycol ether with sodium and naphthalene and thereby forming a green solution of the sodium naphthalene addition compound in the ether and distilling off the thus purified ether.

11. In the process claimed in claim 3 the step of preliminarily purifying the dimethyl glycol ether with a concentrated caustic alkaline solution.

NORMAN D. SCOTT.